United States Patent
Gibbons et al.

(10) Patent No.: US 7,801,992 B2
(45) Date of Patent: Sep. 21, 2010

(54) NETWORK BANDWIDTH CONTROL

(75) Inventors: Wayne James Gibbons, Frankston (AU); Geoffrey David Benson, Malabar (AU); Minh Xuan Nguyen, Footscray (AU); Andrew Edward Kurdzinski, Research (AU); Ian James Palmer, Hampton (AU); Peter Nicholas Schurr, Melbourne (AU)

(73) Assignee: Telstra Corporation Limited, Melbourne Victoria (AU)

( * ) Notice: Subject to any disclaimer, the term of this patent is extended or adjusted under 35 U.S.C. 154(b) by 1610 days.

(21) Appl. No.: 10/150,754

(22) Filed: May 17, 2002

(65) Prior Publication Data

US 2003/0002529 A1 Jan. 2, 2003

Related U.S. Application Data

(60) Provisional application No. 60/292,010, filed on May 18, 2001.

(51) Int. Cl.
*G06F 15/173* (2006.01)
*G06F 12/00* (2006.01)

(52) U.S. Cl. ..................... 709/226; 709/220

(58) Field of Classification Search .............. 709/226, 709/229, 232, 233, 234, 235, 220, 221; 370/229, 370/231–235
See application file for complete search history.

(56) References Cited

U.S. PATENT DOCUMENTS

| 5,289,461 | A | * | 2/1994 | de Nijs | 370/360 |
| 5,673,262 | A | * | 9/1997 | Shimizu | 370/385 |
| 5,878,029 | A | * | 3/1999 | Hasegawa et al. | 370/236 |
| 6,671,724 | B1 | * | 12/2003 | Pandya et al. | 709/226 |
| 6,741,572 | B1 | * | 5/2004 | Graves et al. | 370/254 |
| 6,751,662 | B1 | * | 6/2004 | Natarajan et al. | 709/223 |
| 6,973,034 | B1 | * | 12/2005 | Natarajan et al. | 370/232 |
| 2001/0023453 | A1 | * | 9/2001 | Sundqvist | 709/232 |

FOREIGN PATENT DOCUMENTS

| JP | 7-154392 | 6/1995 |
| JP | 2000-069039 | 3/2000 |

OTHER PUBLICATIONS

Tsunekawa, K., et al., "*Automatic VC Setup System Over ATM PVC Network*," The 1996 Communications Society Conference of IEICE, B-858, (1996) p. 343.

* cited by examiner

*Primary Examiner*—Zarni Maung
(74) *Attorney, Agent, or Firm*—Nixon Peabody LLP

(57) ABSTRACT

A system for controlling the bandwidth allocated to a network connection between two nodes. The system receives a bandwidth change request, and generates and sends control commands to network switches of the connection in order to satisfy the change request. A bandwidth control interface, available over the Internet, has code for generating a display of bandwidths available for selection; code for receiving a bandwidth selection chosen from the bandwidths; and code for sending the change request to the network to adjust the bandwidth on the basis of the selection. The interface provides a bandwidth dial representation of the bandwidths that can be selected.

17 Claims, 5 Drawing Sheets

NETWORK BANDWIDTH CONTROL

RELATION TO PREVIOUSLY FILED APPLICATION

Priority is claimed from applicants' U.S. provisional patent application Ser. No. 60/292,010 filed on May 18, 2001 entitled "Network Bandwidth Control."

FIELD OF THE INVENTION

The present invention relates to communications networks, and in particular to a system for controlling the bandwidth allocated to a network connection.

BACKGROUND OF THE INVENTION

Wideband communications networks are established by network providers to allow communication between a customer's sites. For example, a customer may have a network 46 established between a single-tenanted building 40 and a multi-tenanted building 30 in different cities, to establish a corporate virtual local area network (VLAN), as shown in FIG. 1. The network 46 may comprise a wideband internet protocol (IP) core 44, linked to the buildings with optical fibre, and interfaced through network switches 32, 34 to customer premises equipment (CPE) 36,42. The cost to the customer will depend upon the bandwidth of the network connection between the sites. In general, customers will want to keep the bandwidth provisioned to their network as low as practical to minimise costs. However, there may be an occasional need for increased bandwidth to support high throughput applications.

In existing networks, customers may request additional bandwidth from the network provider by informing a customer service representative. After the request is approved, it is passed to network personnel who reconfigure the network to allocate the required bandwidth to the customer's network. However, this process may not occur rapidly enough to meet the customer's needs. Moreover, the customer may only need the additional bandwidth for a short period of time, possibly even as little as several minutes. The high cost of the extra bandwidth makes it desirable to be able to reduce the allocated bandwidth after the customer's short-term needs have been satisfied. It is desired, therefore, to provide a system for controlling the bandwidth allocated to a network connection, or at least a useful alternative to existing systems.

SUMMARY OF THE INVENTION

In accordance with the present invention there is provided a system for controlling the bandwidth allocated to a network connection between two nodes, including:
  means for receiving a bandwidth change request;
  means for generating control commands to control a plurality of network elements of said network connection in order to satisfy said change request; and
  means for sending said commands to said network elements.

The present invention also provides a method of controlling bandwidth allocated to a network connection, including:
  receiving a bandwidth change request from a remote computer system over a communications network;
  identifying at least one switch requiring a configuration change to satisfy said request; and
  generating and sending a configuration change command to said switch.

The present invention also provides a bandwidth control interface including:
  code for generating a display of bandwidths available for selection;
  code for receiving a bandwidth selection, said selection being chosen from said bandwidths; and
  code for sending a request to a network to adjust a bandwidth of said network on the basis of said selection.

BRIEF DESCRIPTION OF THE DRAWINGS

A preferred embodiment of the present invention is hereinafter described, by way of example only, with reference to the accompanying drawings, wherein.

DETAILED DESCRIPTION OF A PREFERRED EMBODIMENT OF THE INVENTION

Figure 2:
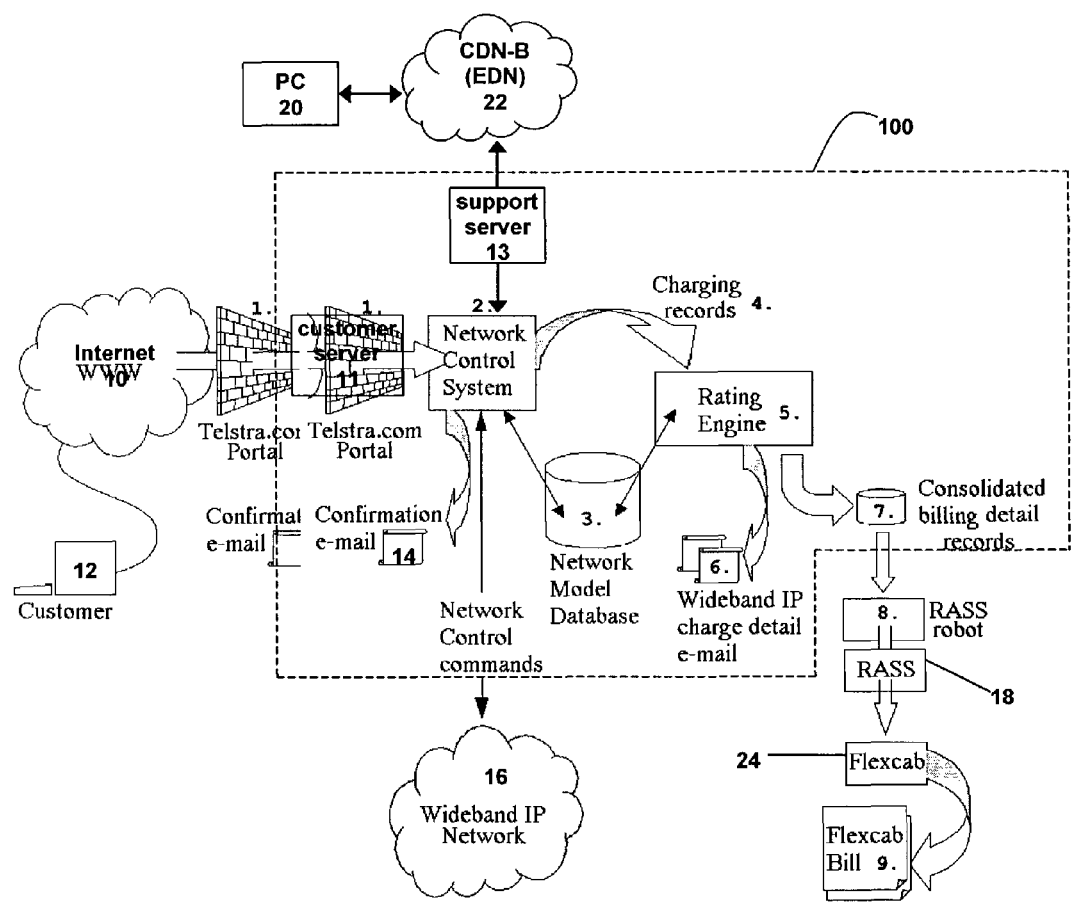
FIG. 2 is a block diagram of a preferred embodiment of a bandwidth control system.

A bandwidth control system 100, as shown in FIG. 2, includes a customer web server 11, a network control system, 2, a network model database 3, and a rating engine 5. The bandwidth control system 100 allows the customers and personnel of a network service provider to dynamically adjust the bandwidth provisioned between two nodes of a customer's network by adjusting user interface controls provided over a communications network 10. An implementation of the bandwidth control system 100 is described where components of the system are provided by software modules stored and executed on otherwise known computer systems. For example, the web server 11 may be a personal computer running a Windows" operating system, and the network control system 2, database 3 and the rating engine 5 may be implemented on a workstation from Sun Microsystems", running Solaris" 2.7, an Oracle" database application, and an Oracle" application server. The network 10 used is the Internet in the described implementation. It will be apparent to those skilled in the art that a number of the software modules and hardware components of the bandwidth control system 100 may be distributed or combined in a variety of ways and at a number of different locations and at least some of the steps executed by the software modules may be executed by hardware circuits, such as application-specific integrated circuits (ASICs).

Figure 1:
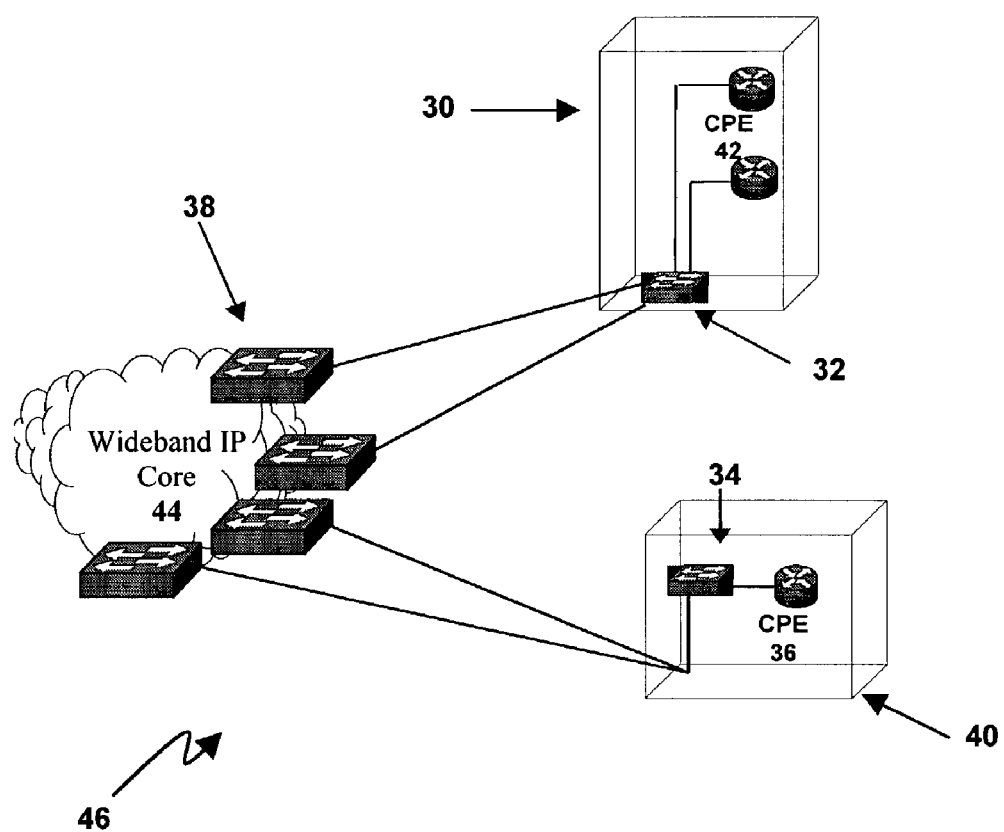
FIG. 1 is a schematic diagram of a wideband IP network connecting two buildings.
Figure 6:
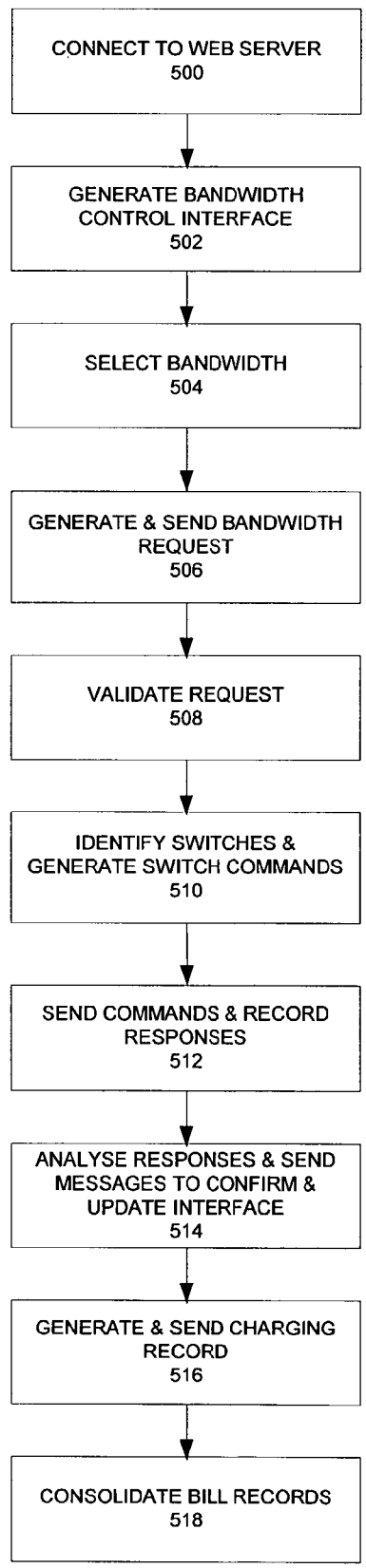
FIG. 6 is a flow diagram of a process executed by the bandwidth control system.

The control system 100 can be used to control a VLAN or virtual private network (VPN) 46 between two buildings for a customer organisation, as shown in FIG. 1, and established by a network provider. The network 46 uses optical fibres to connect a single-tenanted building 40 with a multi-tenanted building 30, and the buildings may be in different cities. The network uses optical fibres to connect the buildings through a wideband IP core 44 with Cisco 6500 series switches 38. The customer equipment 36, 42 in the single and multi-tenanted buildings 40, 30 are interfaced to the optical fibres by Cisco 3500 series and 6500 ethernet switches, 34, 32, respectively. The network 46 may be currently configured to provide a bandwidth of 146 Mbps between the two buildings 30, 40. The customer may wish to trial a new network software application that itself requires high throughput between the two buildings, and the customer estimates that a throughput of 800 Mbps is required, but only for a 30 minute period during the trial. The control system 100 can be used to allocate the extra bandwidth by executing the following described below with reference to FIG. 6.

In order to allocate the extra bandwidth, the customer launches a web browser application on a personal computer 12. The computer 12 is connected to the Internet 10, but not necessarily through the customer's network. For example, the Internet 10 may be accessed from the customer's home through a modem and an Internet service provider (ISP). Once connected to the Internet 10, the customer enters a universal resource locator (URL) (or URI) into the web browser, which directs the browser to a site operated to the network service provider. Specifically, the URL directs the browser to a network firewall 1 which provides secure access to the customer web server 11 of the network provider. In order to gain access to the web server 11, the customer must login to the firewall 1 using a valid username, password, and a dynamically generated identification number generated by a SecurID authenticator provided by RSA Security, Inc.

Figure 3:
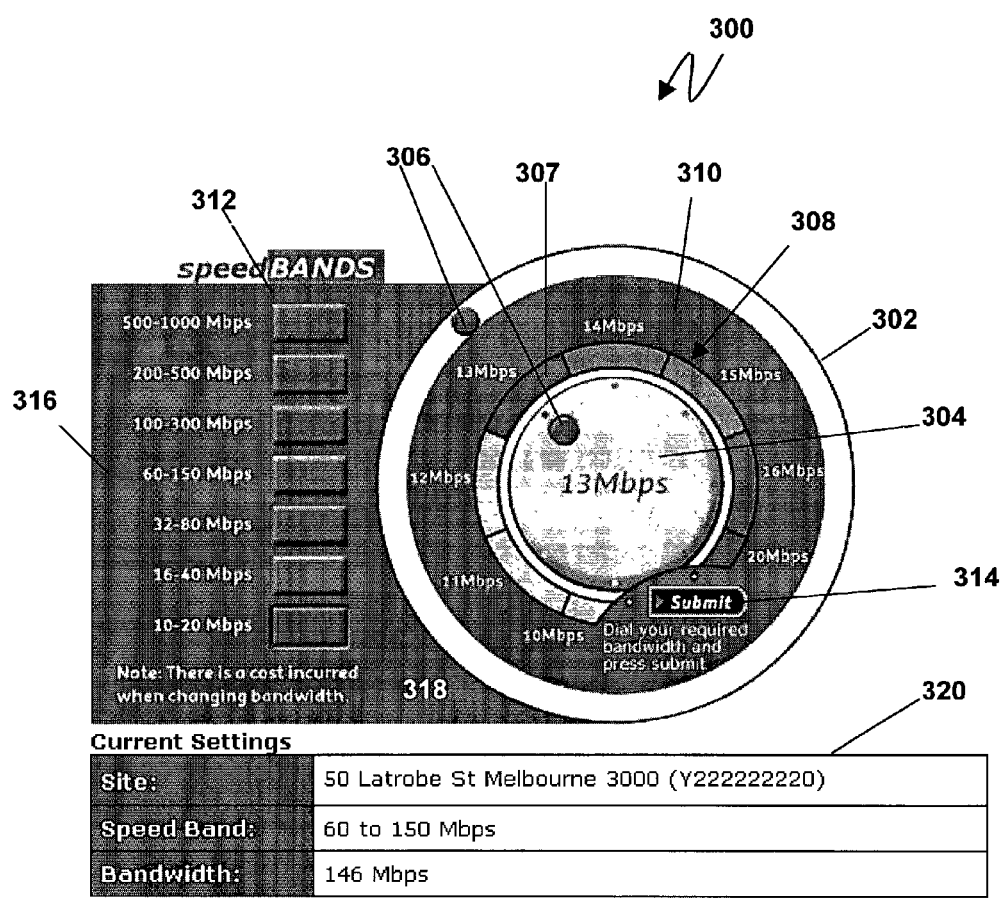
FIG. 3 is a screenshot image of a preferred embodiment of a user interface for the bandwidth control system.

After logging in to the firewall 1, the customer accesses the network provider web server 11 (step 500). Using the web browser, the customer selects a hyperlink to a dynamic web page that generates a network bandwidth interface 300, as shown in FIG. 3 (step 502). The dynamic web page is written in hypertext markup language (HTML) and JavaScript. The interface 300 includes a bandwidth control component 302 for selecting and activating a new bandwidth value, and a bandwidth display component 320 for displaying customer network details, including the site address of a switch or switches 32, 34, 38 to be confirmed, and the currently configured network bandwidth.

The bandwidth control interface 300 includes a series of buttons 312 and corresponding labels 316 that allow the customer to select a pre-defined range or band of network bandwidths. To the right of the buttons 312, a circular dial 302 displays up to eight pre-defined bandwidth values within the selected band. The circular dial 302 is divided into eight pie segments, as in a pie chart, with each available bandwidth value assigned to a particular segment. The dial 302 allows the customer to select a particular bandwidth by moving a pointer over the corresponding part of the dial 312, using a pointing device such as a mouse. For example, FIG. 3 shows the interface 300 after pressing the button 318 to select the lowest bandwidth band, 10-20 Mbps. With in this band, the dial 302 displays eight available bandwidth values: 10, 11, 12, 13, 14, 15, 16, and 20 Mbps. In this Figure, the bandwidth value of 13 Mbps is currently selected, as indicated by the position of the dial indicators 306, the green colour of the corresponding segment 307 of the inner annulus 308, and the value displayed in the dial centre 304.

Figure 4:
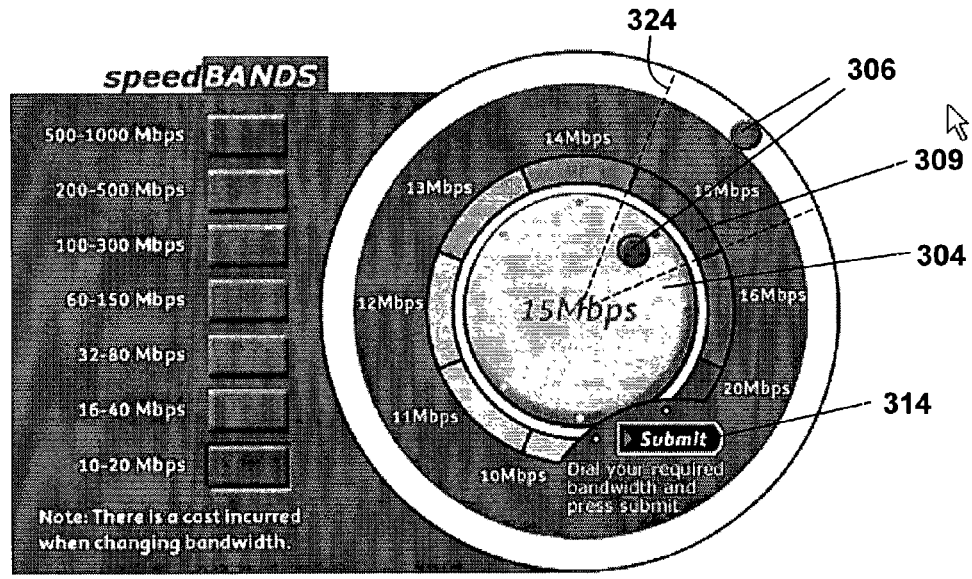
FIGS. 4 to 5 are screenshot images of a bandwidth control component of the interface.
Figure 5:
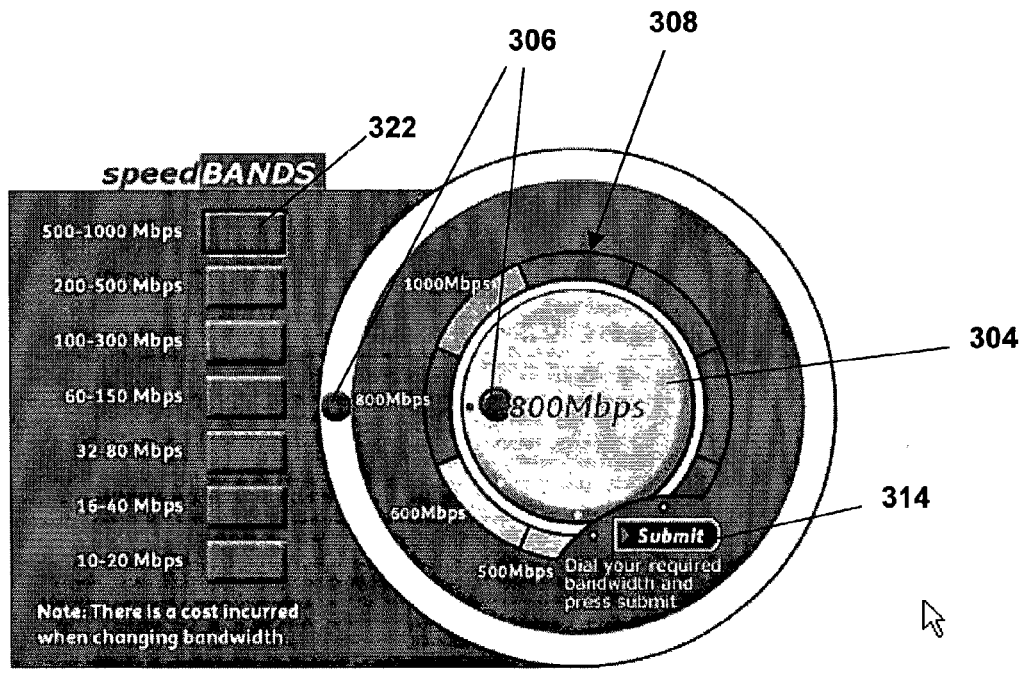

FIG. 4 shows the appearance of the bandwidth control interface 300 after moving the mouse pointer over the 15 Mbps pie segment 324. The dial indicators 306 are now positioned over the 15 Mbps pie segment 324, the corresponding annular segment 309 is green, and the dial centre 304 displays the value "15 Mbps". Not all of the bands have eight bandwidths available. For example, FIG. 5 shows the bandwidth control interface 300 after pressing the "500-1000 Mbps" button 322. There are only four bandwidth values available in this band: 500, 600, 800, and 1000 Mbps, with "800 Mbps" currently selected.

To activate the selected bandwidth, the submit button 314 is pressed (step 504). Upon receiving the corresponding request, the web server 11 executes a script that submits the bandwidth request to the network control system 2 (step 506). The network control system 2 receives the bandwidth request and performs a query on the network model database 3 in order to verify that the request is valid. This requires verification that the requested bandwidth is supported by the customer's network (step 508). If the request is valid, then further queries are performed on the database 3 in order to identify the switches in the customer network 46 whose configurations must be changed in order to satisfy the bandwidth request, and the appropriate format of the command that must be sent to each switch (step 510). Given the customer and site, the network model database 3 provides the IP addresses of these switches.

The configuration of a Cisco switch may be changed by sending commands to the switch using a command-line interface and the telnet protocol. For example, to change the rate-limit configuration of a VLAN named 'vlan-name' in a Cisco 6500-series switch to 20 Mbps (20480 kbps), the following command would be sent:

set qos policer aggregate vlan-name rate 20480 burst
        32 drop

This is a request to change the quality-of-service (QOS) traffic policing policy for aggregate (i.e., all) traffic on 'vlan0name' to be 20480 kbps, with a 32 kbps burst capacity above the stated rate-limit, and to drop any traffic that is outside the rate-limit profile.

The network control system 2 creates a child process for each switch that needs to be changed. Each child process runs an Expect script that sends the appropriate command to the nominated switch and records the response from the switch (step 512). When all of the child processes have terminated, the network control system 2 analyses the switch responses. If the switch responses indicate that all of the QOS changes were successful, then the network control system 2 performs a number of tasks. One task is to send a message to the server 11, indicating that the bandwidth change was successful. When the server 11 receives the notification, it generates a notification window with an "OK" button on the customer's web browser, indicating that the network change was successful. When the customer clicks "OK" to dismiss the notification window, the web page including the bandwidth control interface is refreshed. This generates a query to the network model database 3 for the current network bandwidth configuration in order to correctly update the bandwidth display component 320 of the interface. Another task performed by the network control system 2 is to generate and send an email message to the customer, indicating the changes that were made to the network (step 514).

Another task performed by the network control system 2 when the bandwidth is changed is to generate a charging record and send it to the rating engine 5 (step 516). The charging record includes information such as the date and time the change was made, who made the change, a VPN identification code, a billing identifier, the network property that was changed, and the new value of the property. The rating engine 5 rates the record according to a set of billing business rules and data stored in the network model database 3, and generates consolidated billing detail records 7 (step 518). The billing records 7 reflect the new charges applicable to the new bandwidth value, and a charge for changing the bandwidth value. The rating engine 5 also generates an email message summarising the charges, and sends it to the customer. The consolidated billing detail records 7 are processed by a Records Automation for Special Services (RASS) robot 8 that enters the details into a RASS order entry and tracking system 18. Records from a RASS system 18 are processed by a billing system 24 that generates the final bill 9 that is sent to the customer.

The bandwidth control system 100 also allows network provider personnel to perform network changes for customers. For example, a customer may telephone a helpdesk operator and request a bandwidth change. The operator, using a web browser executing on a personal computer 20, accesses a support server 13 and uses the same bandwidth control interface described above to change the bandwidth of the customer's network. In either case, if the bandwidth is increased for a period of time and then returned to its original value, the customer is only charged for the increased bandwidth for the time that the network was actually configured at that higher bandwidth. However, a fixed charge applies to every configuration change. The support server 13 includes the same code and executes the same steps as the customer server 11 to generate the control interface 300 and generate and send bandwidth requests to the network control system 2. The support server 13 may be accessed via a private customer support communications network 22.

Whether the bandwidth control system 100 is used by a customer directly or by network personnel at a customer's request, the bandwidth control system 100 greatly simplifies the task of reconfiguring network switches to change the bandwidth allocated to a customer's network. The desired changes are implemented in real-time, and the configuration may be changed as often as required, subject to a five-minute granularity period. If a bandwidth change is requested within five minutes of the previously successful bandwidth change, the request is denied and an error message to that effect is sent to the user's web browser.

Many modifications will be apparent to those skilled in the art without departing from the scope of the present invention as herein described with reference to the accompanying drawings.

What is claimed is:

1. A system for controlling the bandwidth allocated to a network connection between two nodes and having a plurality of network elements located between the two nodes, comprising:
   a user interface for generating and sending, in response to a user selection, a dynamic bandwidth change request for said bandwidth allocated to said network connection;
   a server for sending program code for said user interface over a communications network for generation of a display of said interface on a remote computer system of said user, and for receiving said bandwidth change request; and
   a network control system in communication with said server, for generating control commands to dynamically control the configuration of the plurality of network elements in order to satisfy said dynamic bandwidth change request and sending said commands to said network elements.

2. A system as claimed in claim 1, wherein said interface is a graphical user interface including controls for selecting a value of said bandwidth, said value being included in said bandwidth change request.

3. A system as claimed in claim 2, wherein said graphical user interface includes controls for selecting one of a plurality of bandwidth ranges, and controls for selecting one of a plurality of bandwidth values falling within the currently selected range.

4. A system as claimed in claim 1, wherein said interface includes a dynamic graphical user interface.

5. A system as claimed in claim 1, including means for determining the network addresses of said plurality of network elements whose configurations must be changed to satisfy said change request.

6. A system as claimed in claim 1, including means for receiving and analysing responses from said network elements, and in response thereto, sending messages to confirm said change request has been satisfied.

7. A system as claimed in claim 1, including receiving and analysing responses from said network elements, and generating and sending at least one charging record in response thereto.

8. A system as claimed in claim 7, including generating billing data in response to receipt of said charging record.

9. A system as claimed in claim 1, including generating and sending an electronic message to at least one of the two nodes to confirm said change of request has been satisfied.

10. A system as claimed in claim 1, including means for storing the time of configuration changes of said network elements, and for denying said change request if an elapsed time since the time of a previous configuration change is less than a pre-determined value.

11. A system as claimed in any one of the preceding claims, wherein said network elements are packet switches.

12. A method of controlling bandwidth allocated to a network connection between two nodes and having a plurality of network elements located between the two nodes, comprising:
   receiving a dynamic bandwidth change request for said bandwidth allocated to said network connection from a graphical user interface of a remote computer system over a communications network, the user interface configured to receive a user selection and generate said request in response;
   identifying two or more of the plurality of network elements located between the two nodes requiring a configuration change to satisfy said change request; and
   dynamically generating and sending a configuration change command to said two or more identified network elements.

13. A method as claimed in claim 12, including receiving a response from said elements and sending a message to confirm said configuration change in response thereto.

14. A method as claimed in claim 13, including generating and sending a charging record corresponding to said configuration change for use in generating billing data.

15. A method as claimed in claim 12, including sending said graphical user interface to said remote computer system over said communications network for display to said user.

16. A method as claimed in claim 15, wherein said user interface is displayed by a browser on said remote computer system.

17. A method as claimed in claim 16, wherein said interface provides a representation of a bandwidth dial including controls for making said selection.

* * * * *